United States Patent
Kao et al.

(10) Patent No.: US 9,417,650 B2
(45) Date of Patent: Aug. 16, 2016

(54) SIGNAL BALANCE SYSTEM, LIGHT CONTROL SYSTEM, AND SIGNAL BALANCE METHOD THEREOF

(71) Applicant: Wistron Corporation, New Taipei (TW)

(72) Inventors: Yi-Sheng Kao, New Taipei (TW); Wen-Chin Wu, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 100 days.

(21) Appl. No.: 14/458,683

(22) Filed: Aug. 13, 2014

(65) Prior Publication Data

US 2015/0116098 A1 Apr. 30, 2015

(30) Foreign Application Priority Data

Oct. 31, 2013 (TW) .............................. 102139487 A (51) Int. Cl.
- *G08B 21/00* (2006.01)
- *G05F 5/00* (2006.01)
- *H05B 37/02* (2006.01)

(52) U.S. Cl.
CPC .............. *G05F 5/00* (2013.01); *H05B 37/0236* (2013.01)

(58) Field of Classification Search
CPC ........................................................ G05F 5/00
USPC .................. 340/384.1, 693.1, 691.1; 327/536
See application file for complete search history.

(56) References Cited

U.S. PATENT DOCUMENTS

| | | | |
|---|---|---|---|
| 8,710,911 B2 | 4/2014 | Chien | |
| 2013/0162337 A1* | 6/2013 | Chien | ...................... G06F 3/02 327/536 |
| 2013/0250215 A1 | 9/2013 | Sasaki et al. | |

FOREIGN PATENT DOCUMENTS

| | | |
|---|---|---|
| CN | 101713620 A | 5/2010 |
| TW | 407437 | 10/2000 |
| TW | 201146027 | 12/2011 |
| TW | 201326830 | 7/2013 |
| TW | 201328155 A1 | 7/2013 |
| TW | 201342143 A | 10/2013 |

OTHER PUBLICATIONS

Office Action mailed Jan. 13, 2015 in corresponding TW Application No. 102139487, and English translation of pp. 2-4 thereof.

* cited by examiner

*Primary Examiner* — Jeffery Hofsass
(74) *Attorney, Agent, or Firm* — Muncy, Geissler, Olds & Lowe, P.C.

(57) ABSTRACT

A signal balance system, a light control system, and a signal balance method thereof are disclosed. The signal balance system includes a signal sensing module and a processing module. The signal sensing module is used for detecting an external signal source to generate a sensing signal. The processing module is used for generating an adjusting signal based on the sensing signal, wherein the processing module determines whether the sensing signal exceeds a first threshold; if yes, the processing module decreases the sensing signal to generate the adjusting signal so as to control a controlled device.

20 Claims, 5 Drawing Sheets

SIGNAL BALANCE SYSTEM, LIGHT CONTROL SYSTEM, AND SIGNAL BALANCE METHOD THEREOF

BACKGROUND OF THE INVENTION

1. Field of the Invention

The present invention relates a signal balance system and signal balance method thereof, and more specifically, to a system for adjusting a signal of an external signal source to control a signal balance system of a controlled device and a signal balance method thereof.

2. Description of the Related Art

With the development of technology, modern people also gradually pay increasing attention to their quality of life. As a result, lighting units today are used not only for illumination but also for decoration. In the prior art, there is already a technique disclosed in which a signal generated by a sensor is used to adjust the brightness of the lighting unit. The sensor detects an external signal source, such as detecting an external sound volume via an audio sensor, and controls the lighting unit to adjust the level of brightness based on the volume. However, the sensor and the lighting unit have their own reaction regions, so they might not switch perfectly. As a result, when the reaction region of the lighting unit is small and the sensing signal received by the sensor is either too strong or too weak, the lighting unit will not illuminate correspondingly. The lighting unit also cannot truly reflect the sensing signal if a sensing signal that is either too strong or weak is ignored, which will cause the user not to really sense the change in the sensing signal.

Therefore, there is a need to invent a new signal balance system and signal balance method thereof so as to obviate the aforementioned problems.

SUMMARY OF THE INVENTION

It is an object of the present invention to provide a signal balance system that has an effect of adjusting an external signal source so as to control a controlled device.

It is another object of the present invention to provide a signal balance method thereof.

It is still another object of the present invention to provide a light control system which applies the aforementioned method.

To achieve the above-mentioned objects, the signal balance system of the present invention is used for controlling a controlled device based on the signal of an external signal source. The signal balance system includes a signal detecting module and a processing module. The signal detecting module is used for detecting the external signal source to obtain the sensing signal. The processing module is used for generating an adjusting signal based on the sensing signal, wherein the processing module determines whether the sensing signal exceeds a first threshold; if yes, the processing module decreases the sensing signal to generate an adjusting signal so as to control a controlled device.

The signal balance method of the present invention comprises: detecting an external signal source so as to obtain a sensing signal; determining whether the sensing signal exceeds a first threshold; if yes, decreasing the sensing signal to generate an adjusting signal so as to control a controlled device.

The light control system of the present invention is used for controlling a lighting unit based on the signal of the audio source. The light control device includes a signal detecting module and a processing module. The signal detecting module is used for detecting an audio source so as to obtain a sensing signal. A light control device is used for controlling a lighting unit based on the signal of an audio source. The light control device includes a signal detecting module used for detecting an audio source so as to obtain a sensing signal, and the processing module is electronically connected to the signal detecting module so as to generate an adjusting signal based on the sensing signal, wherein the processing module is used for determining if the sensing signal exceeds a first threshold. If the sensing signal exceeds the first threshold, the processing module decreases the sensing signal so as to obtain the adjusting signal; if the sensing signal is less than the first threshold and higher than a second threshold, the processing module is used for equalizing the adjusting signal level and the sensing signal level. Therefore, the processing is used for adjusting an electrical signal based on the adjusting signal so as to control the brightness of the lighting unit.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENT

For facilitating understanding and clarifying the object, characteristics and advantages of the present invention, following specific embodiments and figures of the present invention are presented as a detailed description.

Figure 1:
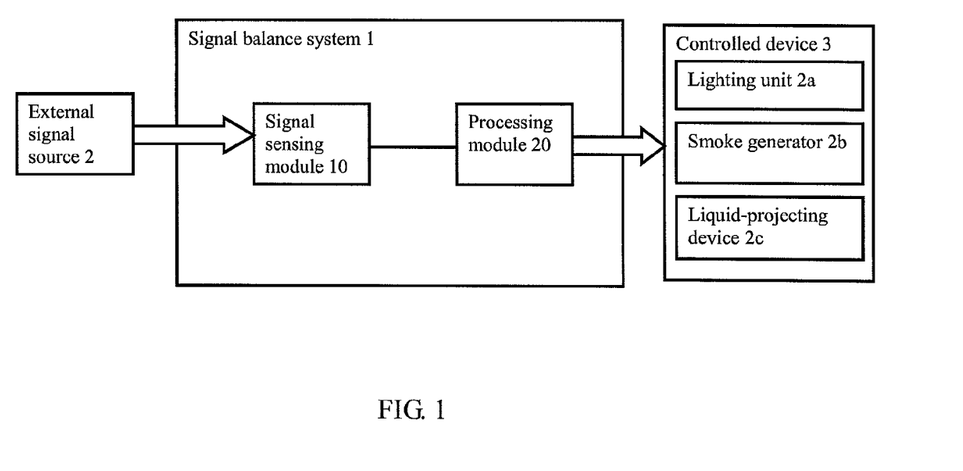
FIG. 1 illustrates a structure conceptual diagram of the signal balance system of the present invention.

Please first refer to FIG. 1, which is a structure schematic diagram of the signal balance system of the present invention.

The signal balance system 1 of the present invention is used for controlling a controlled device 3 according to a signal generated by an external signal source 2, which makes the controlled device generate a corresponding signal according to the level of the external signal source 2. The external signal source 2 may be a signal of sound, temperature, brightness, or other type, but the present invention is not limited thereto. The signal balance system 1 comprises a signal sensing module 10 and a processing module 20. The signal sensing module 10 is used for detecting the external signal source 2 to generate a sensing signal according to the level of the external signal source 2. The processing module 20 is electronically connected to the signal detecting module 10 to generate an adjusting signal so as to control the controlled device 3 according to the sensing signal. The processing module 20 may adjust the output voltage signal (and the like ways) so as to control the controlled device 3. But the present invention is not limited thereto.

The controlled device 3 may include a lighting unit 2a, a smoke generator 2b, a liquid-projecting device 2c, or other devices, or it may be just one of the aforementioned devices. But the present invention is not limited thereto. The processing module 20 is used for adjusting the brightness or color of the lighting unit 2a when the controlled device 3 is a lighting unit 2a. When the controlled device 3 is a smoke generator 2b, the processing module 20 is used for adjusting the smoke concentration of the smoke generator 2b according to the adjusting signal. When the controlled device 3 is a liquid-projecting device 2c, the processing module 20 is used for adjusting the projecting height of the liquid-projecting device 2c according to the adjusting signal. However, the aforementioned controlled devices 3 are used for explanation only. The present invention and the way to adjust the controlled devices 3 should not be taken to limit the invention to the specific embodiments.

Figure 2:
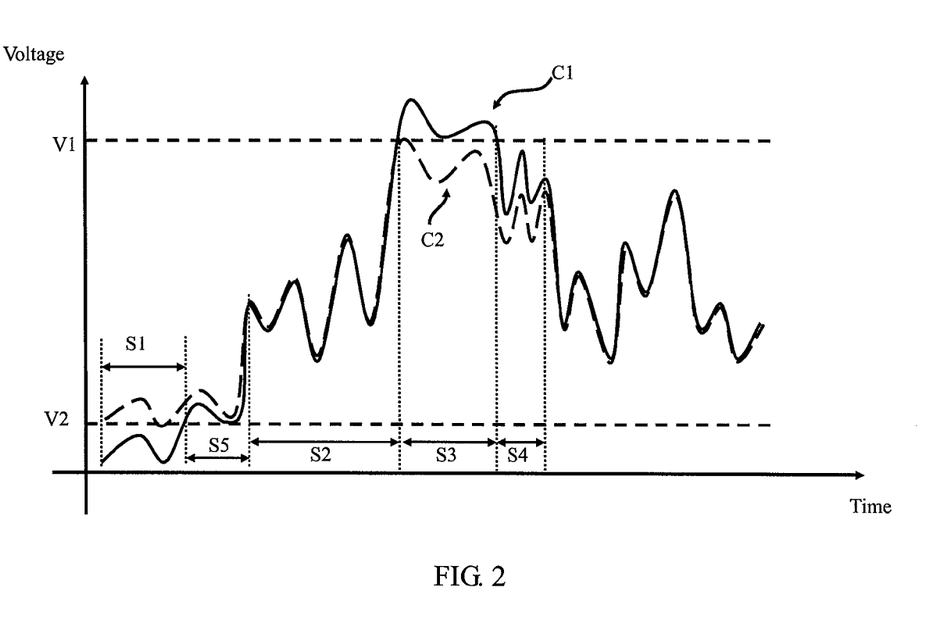
FIG. 2 illustrates a contrast conceptual diagram of the sensing signal and the adjusting signal of the present invention.

Please note that the processing module 20 of the present invention does not directly generate the adjusting signal according to the level of the sensing signal. Please refer to FIG. 2. FIG. 2 is a contrast conceptual diagram of the sensing signal and adjusting signal curves of the present invention.

The processing module 20 is used for determining whether the sensing signal is higher or lower than a specified value, or in a range between two specified values. The range is a region between the first threshold V1 and the second threshold V2. In the exemplary embodiment of the present invention, the second threshold V2 is less than the first threshold V1. The first threshold V1 is the largest signal value activating the controlled device 3, while the second threshold V2 is the smallest signal value activating the controlled device 3. The processing module 20 first determines whether the sensing signal exceeds the second threshold V2. If yes, then the processing module 20 adjusts the adjusting signal level based on the sensing signal level so as to equalize the adjusting signal and the sensing signal. That is, the module generates an identical adjusting signal curve C2 when the sensing curve C1 exceeds the second threshold V2, as shown in the second section S2 of FIG. 2. After that, the processing module 20 further determines whether the sensing signal exceeds the first threshold V1 so as to prevent the controlled device 3 from not reflecting the actual sensing signal and making the user unable to sense the change in the sensing signal. If the sensing signal exceeds the first threshold V1, the process decreases the sensing signal according to a first proportion so as to generate an adjusting signal. That is, the processing module 20 decreases the sensing signal curve C1 to generate the adjusting signal curve C2 in the third section S3 when the sensing signal curve C1 exceeds the first threshold V1. The processing module 20 may decrease the sensing signal curve C1 by linearly or non-linearly decreasing the sensing signal curve C1 according to the first proportion, or by using equations or looking up tables to decrease the sensing signal C1. But the present invention is not limited thereto.

When the sensing signal curve C1 exceeds the first threshold V1, the processing module 20 further determines whether the sensing signal curve C1 has decreased to a value less than the first threshold V1 over a first specific time. If the sensing signal curve C1 decreases to a value less than the first threshold V1 without exceeding the first specific time, the processing module 20 continues to decrease the sensing signal curve C1 according to the first proportion. In the present embodiment, the first specific time is a time such as the time corresponding to the fourth section S4. If the sensing signal curve C1 has already decreased to a value less than the first threshold V1 over the first specific time, the processing module 20 returns to generate the adjusting signal curve C2 according to the sensing signal curve C1. On the other hand, if the sensing signal curve C1 is less than the second threshold V2, the processing module 20 increases the sensing signal curve C1 so as to generate the adjusting signal, which is the same as the first section S1. Similarly, the processing module 20 may increase the sensing signal curve C1 linearly or non-linearly according to the second proportion or use equations or look up tables to increase the sensing signal C1. But the present invention is not limited thereto. Thus, the adjusting signal curve C2 shown in FIG. 2 may be generated. The adjusting signal curve C2 may vary in a range between the first threshold V1 and the second threshold V2, and the way it varies is similar to the sensing signal curve C1.

Otherwise, in a preferred embodiment of the present invention, if the sensing signal curve C1 is increased from below the second threshold V2 to above the second threshold V2, the processing module 20 simultaneously determines whether the sensing signal curve C1 is increased such that it exceeds the second threshold V2 over the second specific time. If no, the processing module 20 should increase the sensing signal curve C1 so as to generate an adjusting signal, as shown in fifth section S5 of FIG. 2.

Please note that every aforementioned module may be implemented via an electrical circuit or other appropriate methods in addition to a hardware device, software program, firmware, or combinations of those. In addition, every module may be set with an independent method and also with combined methods. In a preferred embodiment, all of the modules are stored in the memory as software and a processor is used to execute every module so as to achieve the function of the present invention. Furthermore, the embodiment described is a preferred embodiment of the present invention provided for reference. Not all possible combinations are described in detail to avoid redundancy. However, those skilled in the art may understand that not all the aforementioned modules or units are necessary. In order to execute the present invention, other detailed modules or units of the prior art may be included. Any of the modules or units can be omitted or modified depending on user requirements, and other modules or units may or may not exist between any two modules.

Figure 3A:
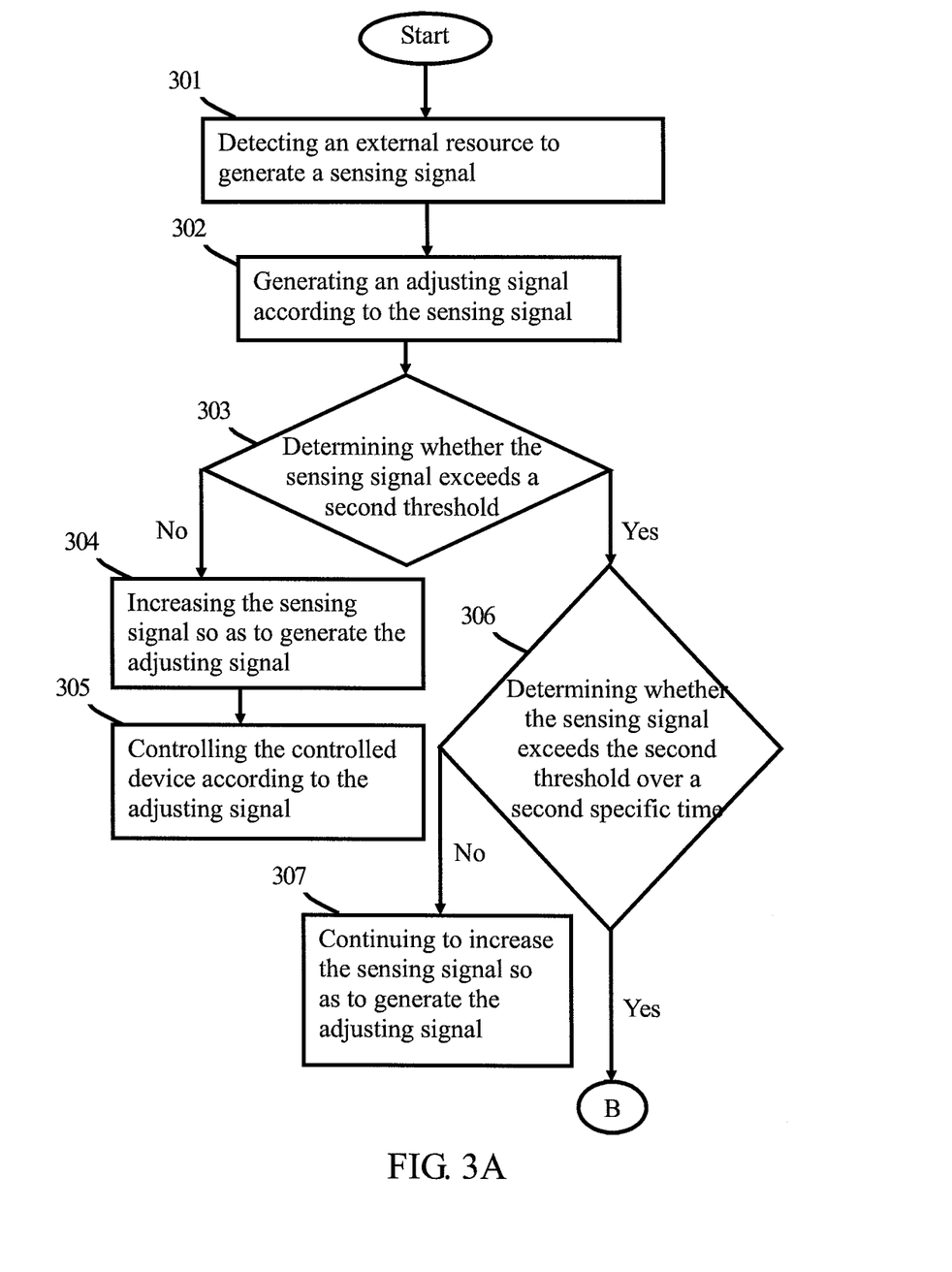
FIG. 3A-3B illustrate a procedure diagram of the signal balance method of the present invention.
Figure 3B:
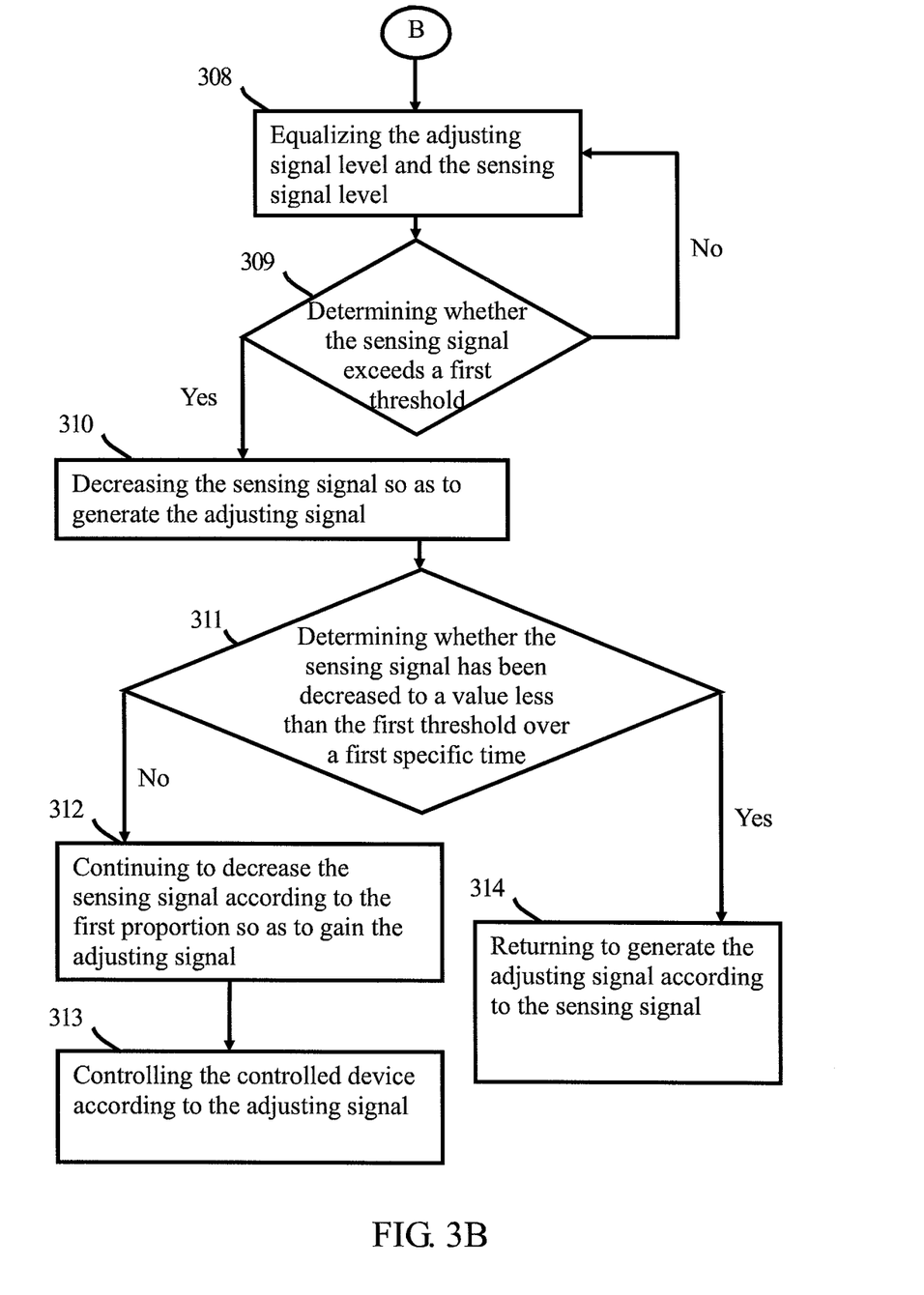

Now please refer to FIG. 3A and FIG. 3B, which present a flow chart of the signal balance method of the present invention. It is to be understood that although the signal balance system 1 is used as an example of the signal balance method of the present invention, it is not limited thereto.

First proceed with step 301: detecting an external resource to generate a sensing signal.

First the signal detecting module 10 is used for detecting an external resource so as to generate a sensing signal according to a signal generated by an external resource 2.

Then proceed with step 302: generating an adjusting signal according to the sensing signal.

Then a processing module 20 generates an adjusting signal according to the sensing signal after the signal detecting module 10 gains the sensing signal.

Next, the processing module 20 executes step 303: determining whether the sensing signal exceeds a second threshold.

Now the processing module may first determine whether the value of the sensing signal exceeds the second threshold V2, and the threshold V2 may be the minimum signal value to activate the controlled device 3. That is, the controlled device 3 may not be activated when the signal given to the controlled device 3 is less than the second threshold V2.

Therefore, if the sensing signal is less than the second threshold V2, the processing module 20 may execute step 304: increasing the sensing signal so as to generate the adjusting signal.

Now, the processing module 20 may increase the sensing signal so as to generate the adjusting signal. The processing module 20 may linearly or non-linearly increase the sensing signal according to the second proportion or use equations or look up tables to increase the sensing signal. But the present invention is not limited thereto.

Then proceed with step 305: controlling the controlled device according to the adjusting signal.

Then the processing module 20 may control the controlled device according to the adjusting signal.

If the sensing signal exceeds the second threshold V2, the processing module 20 may execute step 306: determining whether the sensing signal exceeds the second threshold over a second specific time.

The processing module 20 further determines whether the sensing signal has been increased such that it exceeds the second threshold over the second specific time.

If the sensing signal has not been increased such that it exceeds the second threshold V2 or it has already exceeded the second threshold V2 but has not exceeded the second specific time, the processing module executes step 307: continuing to increase the sensing signal so as to generate the adjusting signal.

Then the processing module 20 continues to increase the sensing signal. Thus, it may maintain the completeness of the adjusting signal curve.

If the sensing signal exceeds the second threshold V2 over the second specific time, the processing module 20 executes step 308: equalizing the adjusting signal level and the sensing signal level.

When the sensing signal exceeds the second threshold V2, it represents that the signal has entered the signal area for operating the controlled device 3. Therefore, the processing module 20 adjusts the adjusting signal level according to the sensing signal level directly, which equalizes the adjusting signal level and the sensing signal level so as to control the controlled device 3.

Meanwhile, the processing module 20 also executes step 309: determining whether the sensing signal exceeds a first threshold.

Now the processing module 20 may further determine whether the sensing signal exceeds the first threshold V1, wherein the first threshold V1 is the maximum value at which the controlled device 3 is normally activated. Thus, the first threshold V1 must be more than the second threshold V2. If the sensing signal does not exceed the first threshold V1, the processing module 20 will return to step 308 to adjust the adjusting signal level.

Therefore, if the sensing signal has already exceeded the first threshold V1, the processing module 20 executes step 310: decreasing the sensing signal so as to generate the adjusting signal.

Now the processing module 20 may decrease the sensing signal so as to generate the adjusting signal by linearly or non-linearly decreasing the sensing signal according to the first proportion or by using equations or look-up tables to decrease the sensing signal. But the present invention is not limited thereto. Decreasing the sensing signal according to the first proportion does not entirely remove the sensing signal exceeding the first threshold V1 but makes the adjusting signal still have a curve similar to that of the sensing signal.

After the sensing signal exceeds the first threshold V1, the processing module 20 further executes step 311: determining whether the sensing signal has been decreased to a value less than the first threshold over a first specific time.

The processing module 20 further determines whether the sensing signal has been decreased to a value less than the first threshold V1 over a first specific time.

If the sensing signal has not been decreased to a value less than the first threshold V1 or it is already below the first threshold V1 but not over the first specific time, the processing module 20 executes step 312: continuing to decrease the sensing signal according to the first proportion so as to generate the adjusting signal.

Now, the processing module 20 continues to decrease the sensing signal according to the first proportion. Thus, it may maintain the completeness of the adjusting signal curve.

Then the process executes step 313: controlling the controlled device according to the adjusting signal.

Then the processing module 20 may control the controlled device 3 according to the adjusting signal. This step is the same as step 305.

If the sensing signal is decreased to a value less than the first threshold V1 over a first specific time, the processing module 20 executes step 314: returning to generate the adjusting signal according to the sensing signal.

The processing module 20 generates the adjusting signal according to the sensing signal. The processing module 20 directly adjusts the adjusting signal level based on the sensing signal level so as to equalize the adjusting signal and the sensing signal to control the controlled device 3, such as adjusting the brightness or color of a lighting unit 2a, adjusting the concentration or color of smoke generated by the smoke generating device, or adjusting the projecting height or strength of the liquid projecting device 2c. But the present invention is not limited thereto.

The method of signal balance of the present invention is not limited to the aforementioned order. The aforementioned order of steps can be changed as long as the goal of the present invention is achieved.

Figure 4:
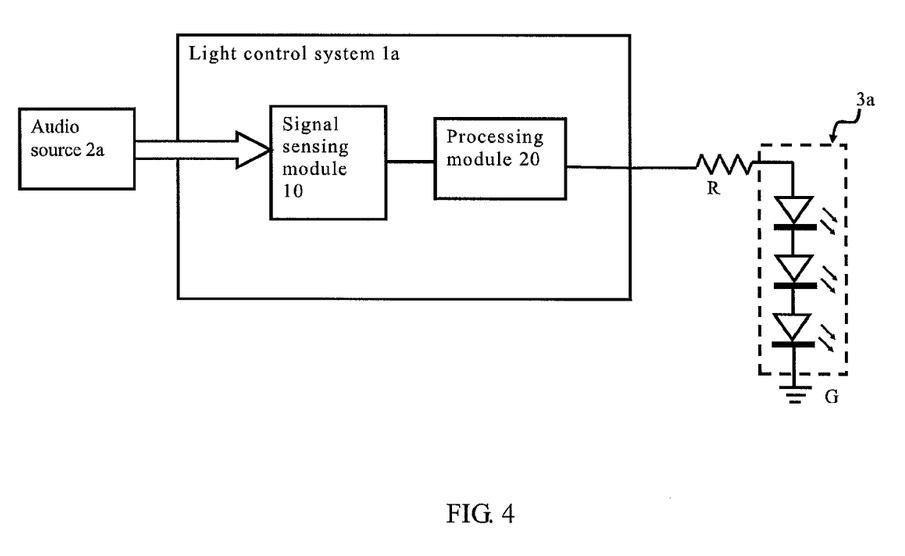
FIG. 4 illustrates a structure conceptual diagram of the light control system of the present invention.

Finally, please refer to FIG. 4, which presents a conceptual figure of the lighting control system structure of the present invention.

In one embodiment of the present invention, the signal balance system 1 may be a light control system 1a, the external signal source may be an audio source 2a, and the controlled device 3 may be a lighting unit 3a, such as an LED, connected to a necessary resistor unit R and ground terminal G. Therefore, the signal sensing module 10 detects the audio signal of the audio source 2a so as to generate the sensing signal. The processing module 20 processes the sensing signal so as to gain the adjusting signal to generate the corresponding voltage signal used for controlling the lighting unit 3a. Thus, if the volume of the audio signal is too low, it may make the representative voltage of the adjusting signal too low to activate the lighting unit 3a normally. Now, the processing module 20 may increase the sensing signal according to the second proportion so as to generate the adjusting signal to activate the lighting unit 3a according to the voltage given by the adjusting signal. Otherwise, if the volume of the audio source is too high and reaches the upper bound of the voltage that the lighting unit 3a is able to receive, the processing module 20 decreases the sensing signal according to the first proportion so as to generate the adjusting signal to activate the lighting unit 3a according to the adjusting signal. Thus, no matter how high the audio source 2a is, the light control system 1a may generate the corresponding adjusting signal to activate the lighting unit 3a.

Although a few exemplary embodiments of the present invention have been shown and described, the present invention is not limited to the described exemplary embodiments. Instead, it will be appreciated by those skilled in the art that changes may be made to these exemplary embodiments without departing from the principles and spirit of the invention, the scope of which is defined by the claims and their equivalents.

What is claimed is:

1. A signal balance method used for a signal balance system for controlling a controlled device based on an external signal source, wherein the method comprises:
    detecting the external signal source to generate a sensing signal;
    determining whether the sensing signal exceeds a first threshold;
    decreasing the sensing signal to generate an adjusting signal if the sensing signal exceeds the first threshold; and
    controlling the controlled device based on the adjusting signal.

2. The signal balance method as claimed in claim 1, wherein the method further comprises:
    equalizing the adjusting signal and the sensing signal to control the controlled device if the sensing signal is less than the first threshold but higher than a second threshold.

3. The signal balance method as claimed in claim 1, wherein the method further comprises:
    determining whether the sensing signal has been decreased to a value less than the first threshold over a first specific time after the sensing signal exceeds the first threshold;
    if no, continuing to decrease the sensing signal so as to generate the adjusting signal; and
    if yes, equalizing the adjusting signal and the sensing signal.

4. The signal balance method as claimed in claim 3, wherein the method further comprises:
    decreasing the sensing signal based on a first proportion so as to generate the adjusting signal.

5. The signal balance method as claimed in claim 2, wherein the method further comprises:
    increasing the sensing signal so as to generate the adjusting signal if the sensing signal is less than the second threshold.

6. The signal balance method as claimed in claim 5, wherein the method further comprises:
    determining if the sensing signal has been increased to a value higher than the second threshold over a second specific time after the sensing signal is less than the second threshold;
    if no, increasing the sensing signal continuously so as to generate the adjusting signal; and
    if yes, equalizing the adjusting signal and the sensing signal.

7. The signal balance method as claimed in claim 6, wherein the method further comprises:
    increasing the sensing signal based on a second proportion so as to generate the adjusting signal.

8. The signal balance method as claimed in claim 1, wherein the method further comprises:
    adjusting a brightness or a color of a lighting unit based on the adjusting signal;
    adjusting a concentration or a color of generated smoke based on the adjusting signal; or
    adjusting a projecting height or a strength of a liquid based on the adjusting signal.

9. A signal balance system used for controlling a controlled device based on an external signal source, wherein the signal balance system includes:
    a signal sensing module used for detecting an external signal source so as to generate a sensing signal; and
    a processing module electronically connected to the signal sensing module so as to generate an adjusting signal based on the sensing signal;
    wherein the processing module is used for determining whether the sensing signal exceeds a first threshold; if the sensing signal exceeds a first threshold, the processing module decreases the sensing signal so as to obtain the adjusting signal to control the controlled device.

10. The signal balance system as claimed in claim 9, wherein the processing module is used for equalizing the adjusting signal level and the sensing signal level if the sensing signal is less than the first threshold and higher than a second threshold.

11. The signal balance system as claimed in claim 9, wherein the processing module is used for further determining whether the sensing signal is decreased to a value less than the first threshold over a specific time after the sensing signal exceeds the first threshold;
    if no, the processing module continues to decrease the sensing signal so as to generate the adjusting signal;
    if yes, the processing module is used for equalizing the adjusting signal level and the sensing signal level.

12. The signal balance system as claimed in claim 11, wherein the processing module is used for decreasing the sensing signal based on a first proportion.

13. The signal balance system as claimed in claim 10, wherein the processing module is used for increasing the sensing signal if the sensing signal is less than the second threshold.

14. The signal balance system as claimed in claim 13, wherein the processing module is used for further determining whether the sensing signal is increased to a value more than the second threshold over a specific time after the sensing signal is less than the second threshold;
    if no, the processing module continues to increase the sensing signal so as to generate the adjusting signal;
    if yes, the processing module is used for equalizing the adjusting signal level and the sensing signal level.

15. The signal balance system as claimed in claim 14, wherein the processing module increases the sensing signal based on a second proportion so as to generate the adjusting signal.

16. The signal balance system as claimed in claim 9, wherein the controlled device can be a lighting unit, a smoke generator, or a liquid-projecting device; the processing module is used for adjusting the brightness or color of the lighting unit when the controlled device is a lighting unit; the processing module is used for adjusting the concentration or color of a generated smoke when the controlled device is a smoke generator; the processing module is used for adjusting the projecting height or strength of the liquid when the controlled device is a liquid-projecting device.

17. A light control device being used for controlling a lighting unit based on the signal of an audio source, the light control device comprising:
    a signal detecting module used for detecting the audio source so as to generate a sensing signal; and
    a processing module electronically connected to the signal detecting module and used for generating an adjusting signal based on the sensing signal, wherein the processing module is used for determining whether the sensing signal exceeds a first threshold; if the sensing signal exceeds a first threshold, the processing module decreases the sensing signal so as to generate the adjusting signal; if the sensing signal is less than the first threshold and higher than a second threshold, the processing module is used for equalizing the adjusting signal level and the sensing signal level; therefore, the processing module is used for adjusting an electrical signal according the adjusting signal so as to control the brightness of the lighting unit.

18. The light control system as claimed in claim 17, wherein the processing module is used for further determining if the sensing signal is decreased to a value less than the first threshold over a specific time after the sensing signal exceeds the first threshold; if no, the processing module continues to decrease the sensing signal so as to generate the adjusting signal; if yes, the processing module equalizes the adjusting signal level and the sensing signal level.

19. The light control system as claimed in claim 18, wherein if the sensing signal is less than the second threshold, the processing module is used for increasing the sensing signal so as to generate the adjusting signal.

20. The light control system as claimed in claim 17, wherein if the sensing signal is less than the second threshold, the processing module is used for increasing the sensing signal so as to generate the adjusting signal.

* * * * *